J. F. REEDER.
PLANTER.
APPLICATION FILED JAN. 13, 1913.
1,075,668.
Patented Oct. 14, 1913.
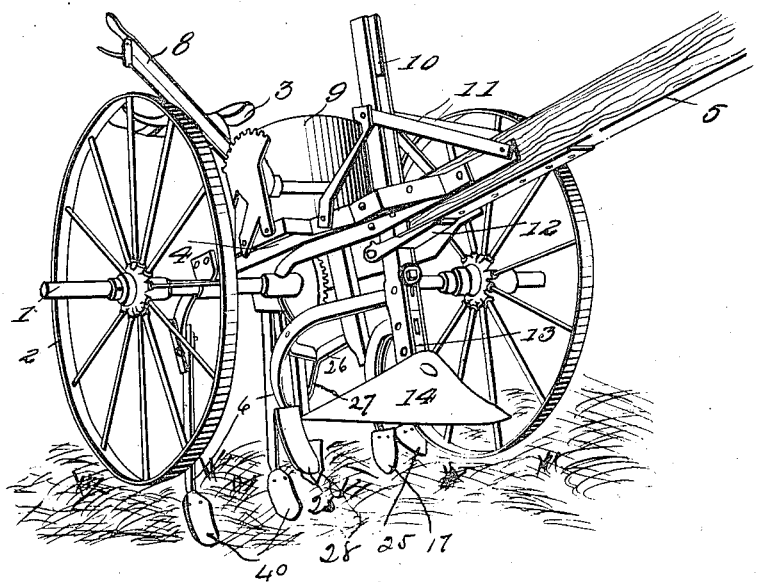
Fig. 1.
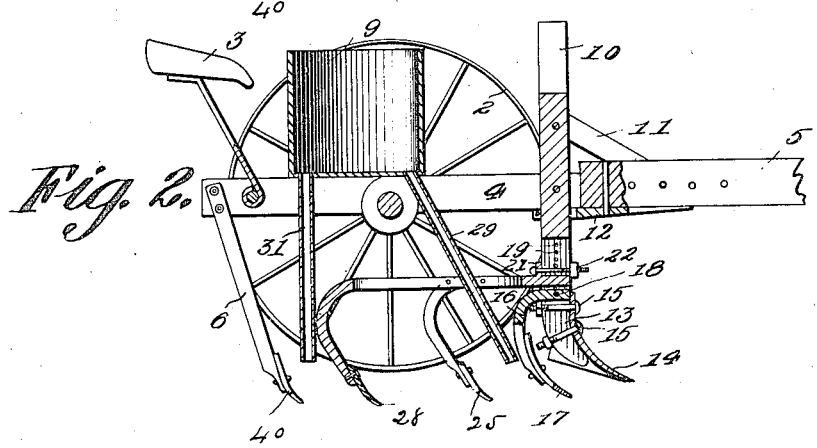
Fig. 2.
Fig. 3.
John F. Reeder,
Inventor,
Witnesses
By
Attorney

UNITED STATES PATENT OFFICE.

JOHN F. REEDER, OF LORAINE, TEXAS.

PLANTER.

1,075,668.   Specification of Letters Patent.   Patented Oct. 14, 1913.

Application filed January 13, 1913. Serial No. 741,720.

*To all whom it may concern:*

Be it known that I, JOHN F. REEDER, a citizen of the United States, residing at Loraine, in the county of Mitchell and State of Texas, have invented certain new and useful Improvements in Planters, of which the following is a specification.

My invention relates to improvements in agricultural implements, and refers particularly to a combination planter and cultivator, the main object of the invention being the provision of an implement which will plant the seed in a shallow and also in a deep furrow, to insure the proper planting of the seed, and which will properly cover the furrows after the planting operation, and also cultivate the soil.

Another object of my invention is the provision of means capable of application to planters and cultivators in use which will effect the planting in deep and shallow furrows as well as the proper covering of the furrows and cultivation of the soil, the means for the said purpose being of simple, durable and inexpensive construction, and thoroughly efficient and practical in every particular.

To attain the desired objects my invention consists of an agricultural implement embodying novel features of construction, combination and arrangement of parts for service substantially as shown, described and particularly defined by the claims.

Figure 1 is a perspective view of an agricultural implement provided or equipped with my improvement. Fig. 2 is a central longitudinal sectional view of the implement with my improvement in position thereon, and Fig. 3 is a perspective view of my improvement detached from the implement to show its novel construction.

Referring by numeral to the drawings, in which similar numerals of reference denote corresponding parts in all the views of the drawings: the numeral 1 designates the axle, 2 the ground wheels, 3 the driver's seat, 4 the frame of the implement, 5 the tongue, 6 the standards for the rear coverers connected to the frame, 25 the front coverers or cultivators, 28 the rear furrow opener, 8 the hand lever for raising and lowering said gangs, and 9 the feed hopper mounted upon the frame, all of which parts are of well known or any desired construction and in connection with which I use my improvement. To the forward part of the frame and adjacent the inner end of the tongue is secured the plow standard 10 which is retained in proper adjustment by means of the braces 11 and the plate 12, and the lower portion of the standard is bifurcated or slotted at 13, and upon said lower end is secured the plow point 14, which is adjustably secured in the slotted or bifurcated end of the standard, by means of the pair of securing bolts 15, by means of which it will be observed that the plow point can be adjusted vertically to regulate the depth of the furrow, as circumstances require. From this construction it will be observed that the plow standard is mounted vertically in the frame and that the plow point is capable of a vertical adjustment in the standard to regulate the depth of the furrow, and fitting in the slotted end of the standard above the plow point is the arm 16, which carries at its lower end the shovel 17, which follows directly in the path of the plow point and makes a furrow some-what deeper than the plow point, and the arm carrying this shovel or furrower is retained in the standard by means of the pin 18, fitting in one of a series of vertical openings 19, which regulate the depth of the furrow to be made by the shovel 17. Fitting in the slotted end of the standard and above the arm 16, is the lug 20 formed with a vertical ear 21, which receives the retaining bolt 22, and formed integral with the lug and ear is the yoke or bail 23, which extends rearward and terminates in a pair of arms 24, to whose lower end are connected the pair of shovels 25. Also connected to the said yoke and disposed in opposite relation to said yoke is the yoke or bail 26, which is formed centrally at its closed portion with a curved arm 27, to which is connected a shovel 28. This construction, as most clearly shown in Fig. 3, forms an open frame or collar and is adjustable at its forward portion in the plow standard, the result of which adjustment causes the shovel 17 at the head of the open frame to cut deeper into the ground than the rear shovel, the result of which is to dig first by means of the shovel 17 a deep furrow and then to dig a shallow furrow by means of a furrower or shovel 28 carried by the frame. To feed the seed in the rear of the deep furrow shovel, I provide a long seed spout 29, which discharges the seed directly in the rear of the first shovel 17 carried by the frame. Thus the implement first opens the ground to a certain depth and the seed is fed to the first or deep furrow in the ground, then it is covered by the two shovels 25 and 25 following directly after the first shovel. Following the first shovel is another shovel or furrower 28 which cuts a furrow not quite as deep as the first shovel, and directly behind the second shovel is the seed dropper 31 which drops the seed into the furrow, and following in behind this come the two shovels 40 which covers the last seed dropped.

From the foregoing description taken in connection with the drawings the operation of my implement will be readily understood and it will be observed that the machine is drawn over the ground and the plow first opens the furrow or breaks the ground, which breaking of the ground is followed by the shovel in line and in rear of the plow point which cuts into the ground and makes a furrow in which the seed is dropped, and following the first furrow which has been supplied with the first planting of the seed comes the shovel which shovel 28 carried by the open frame digs a somewhat shallower trench from the last. Following directly behind the path of this shovel it will be seen that the second seed dropper will perform the same functions as the first, and the two shovels in back of the last seed dropper will cover the seed with the soil, to make the proper sprouting of the seed to produce a healthy crop, and while the making of the furrow and the planting of the seed is effected, the shovels carried by the frame, as well as the gang of shovels perform their function of covering and cultivating the ground, as will be readily understood and appreciated.

The numerous advantages of my invention will be readily understood and appreciated by all persons skilled in the use of such a machine, and it will be observed that the parts have the desired adjustments to suit all conditions, also that the double planting is effected in a perfect manner and will insure a full crop, also the improvements can be applied to implements in use or when the implements are made at the factory and that the improvements while adding greatly to the efficiency of the invention will not materially increase the cost of the implement as a whole.

I claim:

1. In an agricultural implement, the combination with a frame, a front plow and a shovel to the rear thereof, a bail terminating in arms and suitably supported, shovels carried by said arms, a bail on said arms, and a shovel carried thereby.

2. In an agricultural implement, the combination with a frame, a front plow and a shovel to the rear thereof, a bail terminating in arms and suitably supported, shovels carried by said arms, a bail on said arms, a shovel carried thereby, said bails being oppositely disposed, and means securing one of said bails to the plow standard.

In testimony whereof I affix my signature in presence of two witnesses.

JOHN F. REEDER.

Witnesses:
W. M. BENNETT,.
H. M. PERRY.